United States Patent
Liu et al.

(10) Patent No.: US 12,307,704 B2
(45) Date of Patent: May 20, 2025

(54) SURVEILLANCE DEVICE AND SURVEILLANCE METHOD

(71) Applicant: HTC Corporation, Taoyuan (TW)

(72) Inventors: Yen Ting Liu, Taoyuan (TW); Meng-Ju Wu, Taoyuan (TW); Jia-Yau Shiau, Taoyuan (TW)

(73) Assignee: HTC Corporation, Taoyuan (TW)

( * ) Notice: Subject to any disclaimer, the term of this patent is extended or adjusted under 35 U.S.C. 154(b) by 311 days.

(21) Appl. No.: 18/168,576

(22) Filed: Feb. 14, 2023

(65) Prior Publication Data

US 2024/0273749 A1  Aug. 15, 2024

(51) Int. Cl.
G06T 7/70 (2017.01)
G06T 7/20 (2017.01)
G06T 7/579 (2017.01)

(52) U.S. Cl.
CPC .............. G06T 7/70 (2017.01); G06T 7/20 (2013.01); G06T 7/579 (2017.01); *G06T 2207/30232* (2013.01); *G06T 2207/30244* (2013.01)

(58) Field of Classification Search
CPC .. G06T 7/70; G06T 7/20; G06T 7/579; G06T 2207/30232; G06T 2207/30244; G06T 2207/30196; G06T 7/246; A61B 5/1118; A61B 5/1128; A61B 5/746; A61B 5/7465; A61B 5/747; G06V 40/20; H04N 7/18; H04N 23/611

See application file for complete search history.

(56) References Cited

U.S. PATENT DOCUMENTS

| | | | | |
|---|---|---|---|---|
| 11,506,500 B2 * | 11/2022 | Zhang | .................. | G01C 21/383 |
| 2021/0191405 A1 * | 6/2021 | Ma'as | .................... | G06N 3/044 |

FOREIGN PATENT DOCUMENTS

| | | |
|---|---|---|
| CN | 106856558 | 6/2017 |
| CN | 115091466 | 9/2022 |
| CN | 115345932 | 11/2022 |

OTHER PUBLICATIONS

"Office Action of Taiwan Counterpart Application", issued on Apr. 9, 2024, p. 1-p. 9.

* cited by examiner

*Primary Examiner* — Nathan J Flynn
*Assistant Examiner* — Christine A Kurien
(74) *Attorney, Agent, or Firm* — JCIPRNET (57) ABSTRACT

A surveillance device is adapted to provide home care for a care object. The surveillance device includes a camera and a processor. The camera is configured to obtain an object image of the care object. The processor is configured to obtain a simultaneous localization and mapping (SLAM) map of an environment around the care object, obtain a current location of the camera, an estimated location of the camera, an object active area of the care object based on the SLAM map, obtain a current available field of view (FOV) of the camera according to the current location and the object active area based on the SLAM map, obtain an estimated available FOV of the camera according to the estimated location and the object active area based on the SLAM map, and determine a recommended location of the camera based on the current available FOV and the estimated available FOV.

20 Claims, 6 Drawing Sheets

SURVEILLANCE DEVICE AND SURVEILLANCE METHOD

BACKGROUND

Technical Field

The disclosure relates to a surveillance device; particularly, the disclosure relates to a surveillance device and a surveillance method.

Description of Related Art

In the busy modern life, home care provides appropriate care for loved ones while people are on the go. However, the cost of hiring a nanny or a caregiver may be expensive and be a considerable burden. In addition, nursing care via webcam may not be able to provide immediate care, and the care object may move out of the visible range of the webcam.

SUMMARY

The disclosure is direct to a surveillance device and a surveillance method, so as to provide home care to a care object by improving the accuracy of tracking of the care object.

In this disclosure, a surveillance device is provided. The surveillance device is adapted to provide home care for a care object. The surveillance device includes a camera and a processor. The camera is configured to obtain an object image of the care object. The processor is coupled to the camera and is configured to obtain a simultaneous localization and mapping (SLAM) map of an environment around the care object, to obtain a current location of the camera, an estimated location of the camera, and an object active area of the care object based on the SLAM map, to obtain a current available field of view (FOV) of the camera according to the current location of the camera and the object active area based on the SLAM map, to obtain an estimated available FOV of the camera according to the estimated location of the camera and the object active area based on the SLAM map, and determine the current location or the estimated location as a recommended location of the camera based on the current available FOV and the estimated available FOV.

In this disclosure, a surveillance method is provided. The surveillance method is adapted to provide home care for a care object. The surveillance method adapted to provide home care for a care object includes following steps: obtaining a SLAM map of an environment around the care object; obtaining a current location of the camera, an estimated location of the camera, and an object active area of the care object based on the SLAM map, obtaining a current available FOV of a camera according to the current location of the camera and the object active area based on the SLAM map; obtaining an estimated available FOV of the camera according to the estimated location of the camera and the object active area based on the SLAM map; and determining the current location or the estimated location as a recommended location of the camera based on the current available FOV and the estimated available FOV.

Based on the above, according to the surveillance device and surveillance method, low cost and effective home care utilizing the surveillance technology is achieved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

In the busy modern life, home care provides appropriate care for loved ones while people are on the go. However, the cost of hiring a nanny or a caregiver may be expensive and be a considerable burden. In addition, nursing care via webcam may not be able to provide immediate care, and the care object may move out of the visible range of the webcam. Further, while the webcam is disposed too close to the care object, the user may be worried about the influence of the electromagnetic waves to the care object. Furthermore, while the webcam is disposed too far away from the care object, the webcam may not be able to obtain a clear photo or a photo without occlusions. Hence, how to provide a low cost and effective home care utilizing the technology is becoming an issue to work on.

Figure 1:
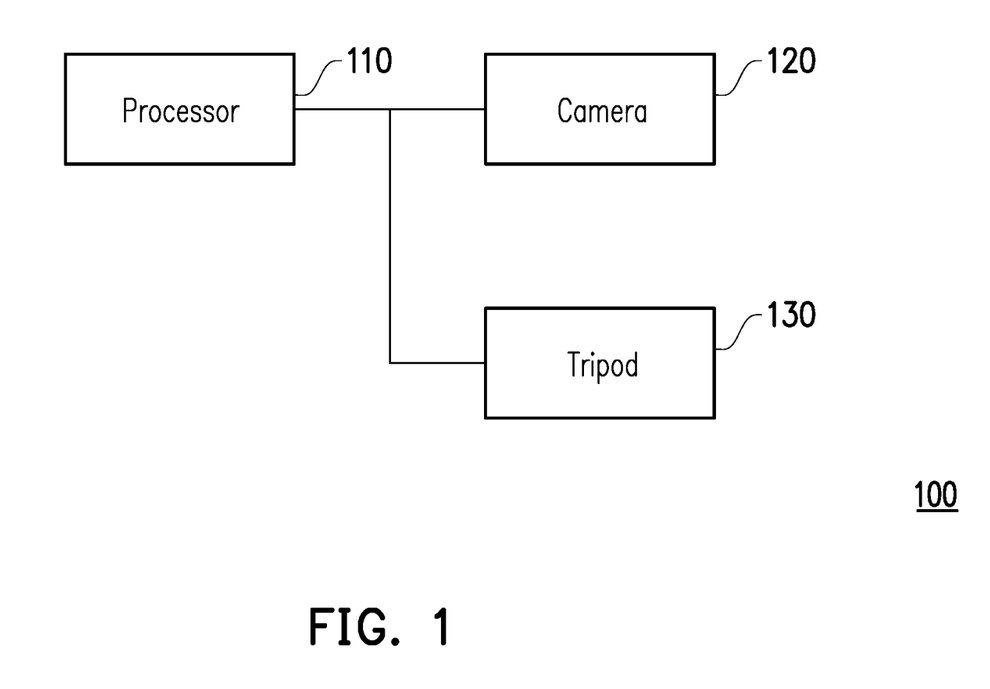
FIG. 1 is a schematic diagram of a surveillance device according to an embodiment of the disclosure.

FIG. 1 is a schematic diagram of a surveillance device according to an embodiment of the disclosure. With reference to FIG. 1, a surveillance device 100 may include a processor 110 and a camera 120. The processor 110 coupled to the camera 120. The surveillance device 100 is adapted to provide home care for a care object. The care object, for example, includes a baby, an elder, and a pet, but this disclosure does not limit thereto. In one embodiment, the care object may be determined by the processor 110 according to a user instruction of the user, but this disclosure does not limit thereto. Further, an object active area may be defined as an area that the care object usually stays or as an environment around the care object.

In one embodiment, the camera 120 is configured to obtain an object image of the care object. In addition, the processor 110 is configured to obtain a simultaneous localization and mapping (SLAM) map of an environment around the care object. Based on the SLAM map, the processor 110 is configured is obtain a current location of the camera 120 and an estimated location of the camera 120. Further, the processor 110 is configured to obtain a current available field of view (FOV) of the camera 120 according to the current location and the object active area based on the SLAM map. Furthermore, the processor 110 is configured to obtain an estimated available FOV of the camera 120 according to the estimated location and the object active area based on the SLAM map. Moreover, the processor 110 is configured to determine the current location or the estimated location as a recommended location of the camera 120 based on the current available FOV and the estimated available FOV.

It is noted that the available FOV may be defined as an available range, an available area, or an available angle that the camera 120 is able to obtain information of the care object without any occlusions while the FOV may be defined as the original range, area, or angle that the camera 120 is able to obtain information. For example, the camera 120 may include a wide-angle lens and an angle of a FOV of the wide-angle lens may be 140 degrees. However, since there may be some obstacles around the camera 120, an available angle of the available FOV may be smaller than 140 degrees.

In one embodiment, a current available angle of the current available FOV and an estimated available angle of the estimated available FOV may be utilized to determine the recommended location. That is, the camera 120 is configured to obtain information of the care object without any occlusions within the current available angle and the camera 120 is configured to obtain information of the care object without any occlusions within the estimated available angle. In this manner, by comparing the current available angle with the estimated available angle, the recommended location of the camera 120 may be determined.

In one embodiment, the SLAM map may be generated by the surveillance device 100 or obtained from an external device, and this disclosure does not limit how the SLAM map is generated or obtained. That is, the processor 110 may be configured to perform a SLAM algorithm based on the camera 120, but this disclosure is not limited thereto. For example, the SLAM algorithm is configured to build a virtual 3D environment corresponding to a real 3D environment around the care object. The SLAM map may include a point cloud of a place that the camera 120 is located (i.e., the current location) or to-be-located (i.e., the estimated location or the recommended location). For example, the place may be a room and the SLAM map may include a point cloud of the room. In other words, the room in the real word is built as a virtual room in a virtual environment based on the SLAM map.

In one embodiment, the processor 110 may be configured to identify any platform-like area (in the virtual 3D environment) that is suitable for disposing the camera 120 based on the SLAM map. That is, the processor 110 is configured to perform a scene understanding algorithm based on the SLAM map. However, this disclosure is not limited thereto. Further, to provide an effective home care utilizing the surveillance device 100, an algorithm of a relocation of the surveillance device 100 (including the camera 120) may be considered. In one embodiment, a better platform-like area may keep the surveillance device 100 (including the camera 120) stable. In another embodiment, a better platform-like area may be a place with least occlusions between the camera 120 and the care object. In yet another embodiment, a better platform-like area may be a place where the care object seldom access (in the purpose of keeping the surveillance device 100 stable). In this manner, with the help of the algorithm of the relocation, the camera 120 is able to track the care object and obtain information from the care object most of the time.

In one embodiment, a user may point out a polygon area (in the virtual 3D environment corresponding to the real environment around the care object) that the user thinks the care object is most active. The processor 110 may be configured to determine the polygon area as the object active area of the care object, which may be also considered as the environment around the care object. That is, the processor 110 may be configured to determine an object active area of the care object according to a user instruction of the user. Moreover, the SLAM map may include a point cloud of the object active area.

In another embodiment, the processor 110 may be configured to perform an objection tracking of the care object based on a tracking algorithm. Further, the processor 110 may be configured to record the tracking of the care object and to generate a tracking record. In this manner, the processor 110 may be configured determine the object active area based on the tracking record. Similarly, the SLAM map may include a point cloud of the object active area based on the tracking record.

In one embodiment, the processor 110 may be configured to emit a plurality of (virtual) estimated beams (in the virtual 3D environment) from an estimated point of a point cloud of one of the plurality of platform-like areas to an object point of a point cloud of the object active area based on the SLAM map. For example, the estimated point may be a center point of the one of the plurality of platform-like areas and the object point may be a center point of the object active area. Based on the straight forward (virtual) estimated beams, an available range, an available area, or an available angle of an available FOV from the one of the plurality of platform-like areas to the object active area may be determined based on the SLAM map.

In one embodiment, the processor 110 may be configured to form a (virtual) spherical surface (also known as an object spherical surface) (in the virtual 3D environment) around the object point of the point cloud of the object active area. The center of the spherical surface may be the object point and the radius of the spherical surface may be determined based on a distance between the estimated point and the object point. For example, the radius of the spherical surface may be one fourth of the distance between the estimated point and the object point, but this disclosure is not limited thereto.

Further, The processor 110 may be configured to emit a plurality of (virtual) estimated beams from the estimated point (in the virtual 3D environment) to the spherical surface and determine whether each of the plurality of estimated beams is able to hit (intersect with) the spherical surface based on the SLAM map. In one embodiment, processor 110 may be configured to emit one beam every 0.5 degree around the estimated point, but this disclosure is not limited thereto. It is noted that, while there is an object blocking an emitting path of one of the plurality of estimated beams, the one of the plurality of estimated beams is then not able to hit the spherical surface. That is, only while no objects are blocking the emitting path of one of the plurality of the estimated beam, the one of the plurality of the estimated beams is able to hit the spherical surface. Hence, a number of the plurality of the estimated beams hitting the spherical surface may be calculated to determine an estimated beam density. In other words, the processor 110 may be configured to obtain an estimated beam density of the spherical surface based on the plurality of the estimated beams, the spherical surface and the SLAM map. The estimated beam density may be used to represent the available FOV of the camera 120 according to the estimated location.

In this manner, a coverage (an intersection) of a movement of the care object (aka the object active area) and a FOV of the camera 120 according to the estimated location, may be calculated, which may be represented by the estimated beam density. Therefore, the processor 110 may be configured to determine an estimated available FOV of the estimated location of the camera 120 without physically moving the camera 120 to the estimated location.

In one embodiment, the processor 110 may be configured to determine a plurality of beam weights based on the angle between each one of the estimated beams and the object active area. For example, while the estimated beam is closer to the object active area, a beam weight of the estimated beam may be larger. Instead, while the estimated beam is farther from the object active area, a beam weight of the estimated beam may be smaller. Hence, the processor 110 may be configured to obtain the estimated beam density according to the plurality beam weights. In this manner, the estimated beam density may represent the intersection of the object active area and the FOV of the camera 120 according to the estimated location more accurately.

In one embodiment, the processor 110 may be configured to determine a plurality of beam weights according to a staying time of the care object in the object active area based on the tracking record. For example, while the estimated beam is within an area with higher staying time, a beam weight of the estimated beam may be larger. Instead, while the estimated beam is within an area with lower staying time, a beam weight of the estimated beam may be smaller. Hence, the processor 110 may be configured to obtain the estimated beam density according to the plurality beam weights. In this manner, the estimated beam density may represent the intersection of the object active area and the FOV of the camera 120 according to the estimated location more accurately.

It is worth mentioned that, other than emitting the plurality of the estimated beams (in the virtual 3D environment) from the estimated point of the estimated location of the camera 120 to the object active area, the processor 110 may be configured to emit a plurality of current beams (in the virtual 3D environment) from a current point of the current location of the camera 120 to the object active area. Further, the processor 110 may be configured to obtain a current beam density of the spherical surface (also known as the object spherical surface) based on the plurality of the current beams, the spherical surface and the SLAM map. In this manner, the processor 110 may be configured to determine a current available FOV of the current location of the camera 120 without performing actually measurements in the real world. The details of the current beams may be referred to the description of the estimated beams, while the details are not redundantly described seriatim herein.

In one embodiment, the processor 110 may be configured to obtain a current available FOV of the camera 120 based on a current location of the camera 120. Further, the processor 110 may be configured to obtain an estimated available FOV of the camera 120 based on an estimated location (e.g., one of the platform-like area with the largest available FOV) of the camera 120. Furthermore, the processor 110 may be configured to compare the estimated available FOV of the camera 120 with the current available FOV of the camera 120 to determine a recommended location of the camera 120. For example, in response to an estimated available angle (or the estimated beam density) of the estimated available FOV being larger than a current available angle (or the current beam density) of the current available FOV, the processor 110 may be configured to determine the estimated location as the recommended location. In this manner, the surveillance device 100 is able to find out a better location around the care object to dispose the camera 120. Therefore, a low cost and effective home care utilizing the surveillance device 100 may be achieved.

In one embodiment, the processor 110 may be configured to scan all the platform-like areas around the care object and obtain a plurality of estimated available FOVs. Further, the processor 110 may configured may be configured to compare each of the plurality of estimated available FOVs of the camera 120 respectively with the current available FOV of the camera 120 to determine a recommended location of the camera 120. For example, the processor 110 may be configured to obtain an estimated available angle of the plurality of estimated available FOVs. Further, the processor 110 may be configured to compare the plurality of estimated available FOVs of the camera 120 respectively with the current available FOV of the camera 120. Furthermore, in response to an estimated available angle of one of the plurality of estimated available FOV is larger than a current available angle of the current available FOV, the processor 110 is configured to determine the one of the estimated location as the recommended location. Moreover, by respectively comparing each of the plurality of estimated available FOVs of the camera 120 respectively with the current available FOV, a best platform-like area with a largest available angle (available FOV) among the plurality of platform-like area may be determined as the recommended location. In this manner, the surveillance device 100 is able to find out a best location around the care object to dispose the camera 120. Therefore, a low cost and effective home care utilizing the technology may be achieved.

In one embodiment, the processor 110 may be configured to scan all the platform-like areas around the user and obtain a plurality of estimated available FOVs and output an estimated location list. The estimated location list may include all the platform-like areas sorted by the plurality of estimated available FOVs corresponding to all the platform-like areas. Therefore, the user may be able to pick a flavor spot based on the estimated location list according to the living habits of the user. For example, one of the platform-like areas may be with the best estimated available FOV, but the user may occasionally put stuff on the one of the platform-like areas. Hence, the user may pick another platform-like area to obtain a better user experience.

In one embodiment, the processor 110 includes, for example, a microcontroller unit (MCU), a central processing unit (CPU), a microprocessor, a digital signal processor (DSP), a programmable controller, a programmable logic device (PLD), other similar devices, or a combination of the devices. The disclosure is not limited thereto. In addition, in an embodiment, each of functions of the processor 110 may be achieved as multiple program codes. The program codes are stored in a memory, and executed by the processor 110. Alternatively, in an embodiment, each of the functions of the processor 110 may be achieved as one or more circuits. The disclosure does not limit the use of software or hardware to achieve the functions of the processor 110.

In one embodiment, the camera 120 includes, for example, a complementary metal oxide semiconductor (CMOS) camera or a charge coupled device (CCD) camera. In one embodiment, the camera 120 may be disposed on a wearable head-mounted display (HMD), wearable glasses (e.g., AR/VR goggles), an electronic device, other similar devices, or a combination of these devices. This disclosure is not limited thereto.

In one embodiment, the surveillance device 100 may further include a tripod 130. The tripod 130 may include a built-in motor that is able to adjust an angle or a height of the camera 120. In this manner, the camera 120 is able to provide a better available FOV. It is noted that, the range of the angle or the height of the camera 120 with the tripod 130 is provided to the processor 110. The processor 110 may be configured to obtain the available FOV of the camera 120 based on the range of the angle or the height of the camera 120 with the tripod 130. That is, an extra angle or an extra height of the camera 120 with the tripod 130 may be also being considered while the processor 110 is calculating the available FOV of the camera 120.

Figure 2A:
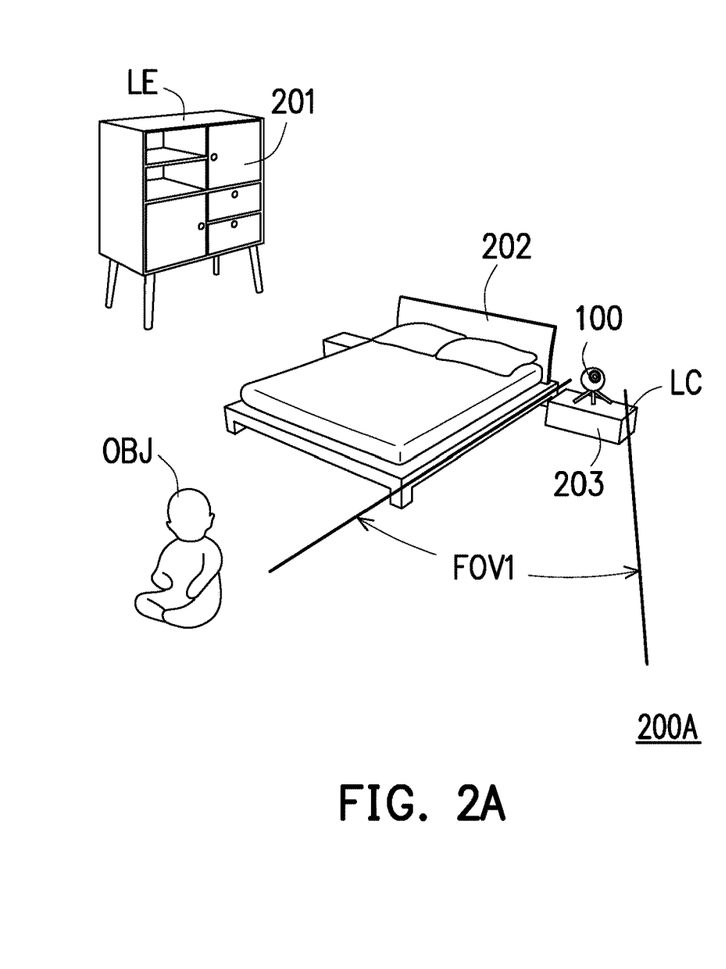
FIG. 2A is a schematic diagram of a surveillance scenario according to an embodiment of the disclosure.
Figure 2B:
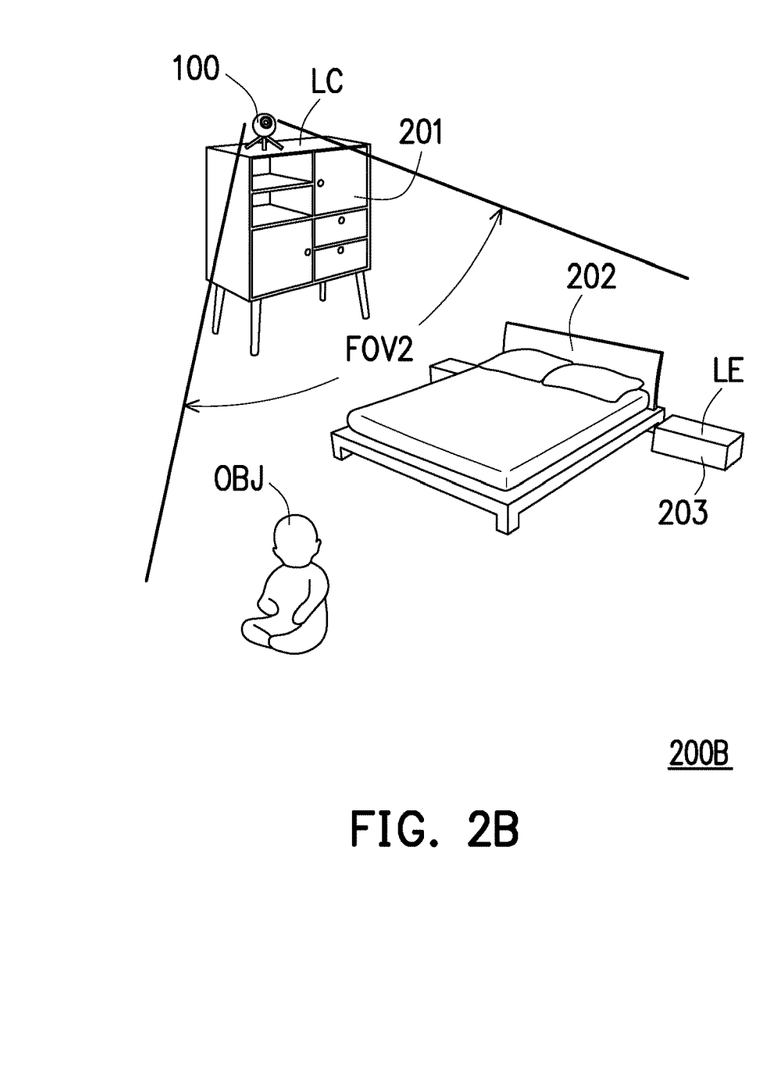
FIG. 2B is a schematic diagram of a surveillance scenario according to an embodiment of the disclosure.

FIG. 2A is a schematic diagram of a surveillance scenario according to an embodiment of the disclosure. FIG. 2B is a schematic diagram of a surveillance scenario according to an embodiment of the disclosure. With reference to FIG. 2A and FIG. 2B, a scenario 200A and a scenario 200B depict how the surveillance device 100 is configured to determine a recommended location of the camera 120 according to an embodiment of the disclosure.

Referring to FIG. 2A first, the scenario 200A may include a care object OBJ, a first object 201, a second object 202, and a third object 203. The camera 120 (the surveillance device 100) may be disposed on a top surface of the third object 203. The top surface of the third object 203 may be a platform-like area and is also known as a current location LC of the camera 120. A top surface of the first object 201 may be a platform-like area and is also known as an estimated location LE of the camera 120. As shown in FIG. 2A, since the second object 202 is huge and disposed right next to the surveillance device 100, the FOV of the camera 120 may be limited (partially blocked) and a first available FOV FOV1 of the camera 120 may be obtained.

Referring to FIG. 2B, the scenario 200B may also include the care object OBJ, the first object 201, the second object 202, and the third object 203. The camera 120 (the surveillance device 100) may be disposed on a top surface of the first object 201. The top surface of the first object 201 may be a platform-like area and is called a current location LC of the camera 120. The top surface of the third object 203 may be a platform-like area and is called an estimated location LE of the camera 120. As shown in FIG. 2B, since the first object 201 is tall than the second object 202 and the third object 203, the FOV of the camera 120 may not be limited (blocked) by the second object 202 and the third object 203 and a second available FOV FOV2 of the camera 120 may be obtained.

In on embodiment, by comparing the first available FOV FOV1 and the second available FOV FOV2, the processor 110 is configured to determine the top surface of the first object 201 or the top surface of the third object 203 as a recommended location of the camera 120 based on the first available FOV FOV1 and the second available FOV FOV2.

It is noted that, instead of physically moving the camera 120 here and there, the processor 110 is configured to determine (calculate) the available FOV of the camera 120 according to an assumed location of the camera 120 (in the virtual 3D environment) based on the SLAM map. Therefore, the processor 110 is able to provide options of the location of the camera 120 without moving the camera 120 to the actually location, thereby improving the user experience.

Figure 3:
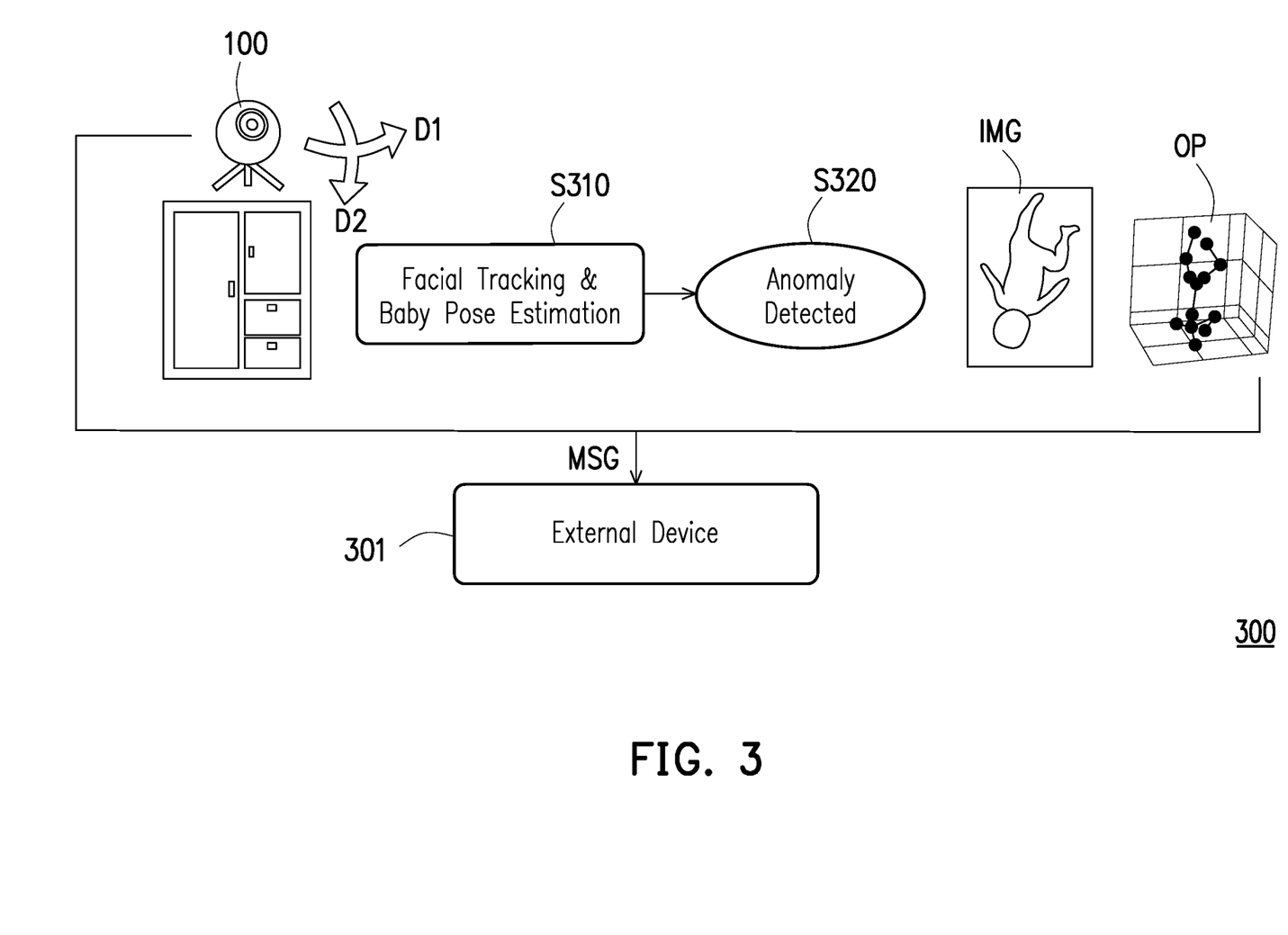
FIG. 3 is a schematic diagram of a surveillance scenario with an anomaly detected according to an embodiment of the disclosure.

FIG. 3 is a schematic diagram of a surveillance scenario with an anomaly detected according to an embodiment of the disclosure. With reference to FIG. 1 to FIG. 3, a scenario 300 depicts how the surveillance device 100 is configured to detect an anomaly of the care object OBJ according to an embodiment of the disclosure.

In one embodiment, the tripod 130 of the surveillance device 100 may be configured to rotate along a first direction D1 and a second direction D2 by a built-in motor. Further, the tripod 130 of the surveillance device 100 may be configured to move up and down and move left and right by the built-in motor. Furthermore, the tripod 130 may be configured to receive an adjusting signal (also known as a first adjusting signal) from the processor 110 and to adjust a parameter (also known as "shooting parameter", e.g., height, direction or angle) of the camera 120 by adjusting the tripod 130 according to the adjust signal. Moreover, the camera 120 may be configured to receive an adjusting signal (also known as a second adjusting signal) from the processor 110 to adjust a parameter (e.g., zoom ratio) of the camera 120 by zooming in or zooming out a lens of the camera 120.

It is noted that, the processor 110 may be configured to perform an objection tracking of the care object OBJ based on a tracking algorithm. For example, the care object OBJ may be a baby and the tracking algorithm may be a human tracking algorithm, a baby body tracking algorithm, a baby hand tracking algorithm, or a baby face tracking algorithm. While it is assumed in the embodiment for the sake of convenience in explanation that the care object OBJ is a baby, it is to be noted that the care object OBJ is not limited to being a baby. In one embodiment, the processor 110 is configured to track the care object OBJ by adjusting the parameter of the camera 120 through the tripod 130 based on the tracking algorithm. In one embodiment, the processor 110 is configured to adjust a shooting angle and/or a shooting depth of the camera 120 based on the tracking algorithm. In other words, the processor 110 is configured to calibrate the camera 120 based on the tracking algorithm.

In one embodiment, in a step S310, the processor 110 is configured to perform a facial tracking and a baby pose estimation based on a baby face tracking algorithm and a baby body tracking algorithm. For example, the camera 120 is configured to obtain a real-time object image IMG of the baby and the processor 110 is configured to obtain a real-time object pose OP of the baby based on the object image IMG. The processor 110 is configured to determine a baby pose of the baby is normal or abnormal based on the object pose OP. In a step S320, in response to the determine the baby pose of the baby being abnormal, the processor 110 is configured to determine an anomaly is detected and output an alarm message MSG to an external device 301 through a network module of the surveillance device 100. The external device 301, for example, includes a mobile phone, a tablet computer, a notebook computer, a desktop computer, or other computing devices, which are not limited in this disclosure. The network module, for example, include a wired network module, a wireless network module, a Bluetooth module, an infrared module, a radio frequency identification (RFID) module, a Zigbee network module, or a near field communication (NFC) network module, but the disclosure is not limited thereto. In this manner, a user may receive the alarm message MSG through the external device 301 and take appropriate action in a timely manner. Therefore, a low cost and effective home care utilizing the surveillance device 100 may be achieved.

In one embodiment, the processor 110 is configured to record the tracking of the care object OBJ and to generate a tracking record. Further, the processor 110 may be configured to determine a tracking area based on the tracking record. In one embodiment, the processor 110 may be configured to record the area that the care object OBJ has been to and determine the area that the care object OBJ has been to as the tracking area. Furthermore, the processor 110 is configured to determine a recommended object active area based on the tracking record (i.e., the tracking area). That is, although the user might expect the care object OBJ stays in the object active area, the care object OBJ may move outside of the object active area. Based on the recommended object active area, the processor 110 is configured to obtain an estimated location LE according to the tracking record. That is, the processor 110 is configured to determine the current location LC or the estimated location LE according to the tracking record as a recommended location of the camera 120 based on the current available FOV and the estimated available FOV. Further, the processor 110 may be configured to output the recommended object active area via the network module of the surveillance device 100. Therefore, a low cost and effective home care utilizing the surveillance device 100 may be achieved.

Figure 4:
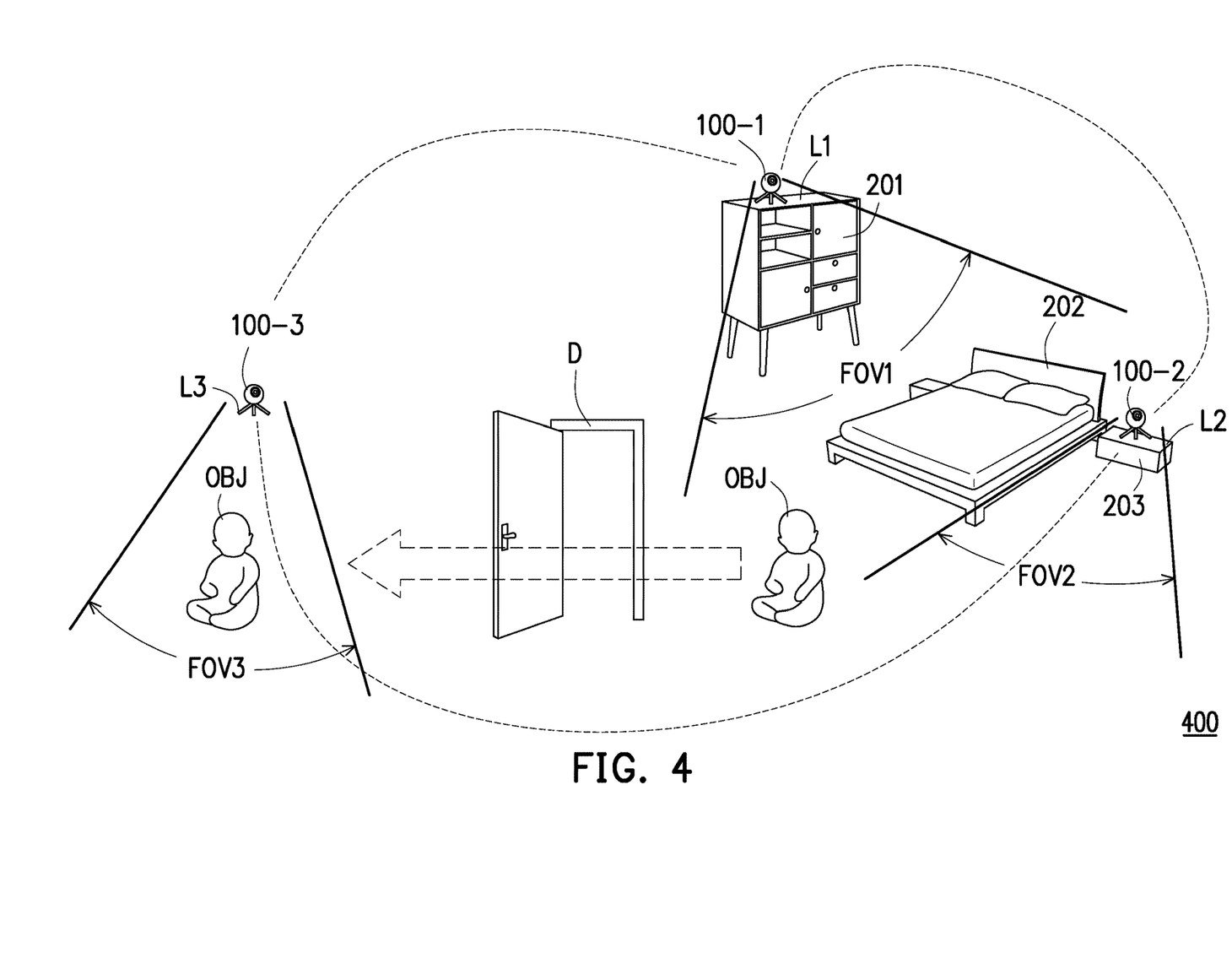
FIG. 4 is a schematic diagram of a surveillance system according to an embodiment of the disclosure.

FIG. 4 is a schematic diagram of a surveillance system according to an embodiment of the disclosure. With reference to FIG. 1 to FIG. 4, a surveillance system 400 may include a first surveillance device 100-1 (also called the surveillance device 100), a second surveillance device 100-2 (also call a collaborative electronic device), and a third surveillance device 100-3 (also call a collaborative electronic device). That is, the surveillance device 100 is configured to form the surveillance system 400 at least one collaborative electronic device. The details of the first surveillance device 100-1, the second surveillance device 100-2, and the third surveillance device 100-3 may be referred to the description of the surveillance device 100, while the details are not described redundantly seriatim herein. Further, while it is assumed in the embodiment for the sake of convenience in explanation that the number of the surveillance device 100 is three, it is to be noted that the number of the surveillance device 100 is not limited to being three.

Referring to FIG. 4, the first surveillance device 100-1 may be disposed at a first location L1, the second surveillance device 100-2 may be disposed at a second location L2, and the third surveillance device 100-3 may be disposed at a third location L3. The first surveillance device 100-1 may include a first available FOV FOV1, the second surveillance device 100-2 may include a second available FOV FOV2, and the third surveillance device 100-3 may include a third available FOV FOV3. The first surveillance device 100-1, the second surveillance device 100-2, and the third surveillance device 100-3 may cooperate with each other to obtain a maximum sum of the first available FOV FOV1, the second available FOV FOV2, and the third available FOV FOV3. That is, each of the processor 110 of the first surveillance device 100-1, the second surveillance device 100-2, and the third surveillance device 100-3 is configured to compensate a collaborative available FOV of a collaborative camera of a collaborative electronic device with the current available FOV of the camera 120 of itself (the surveillance device 100).

In one embodiment, the care object OBJ may move from a current place corresponding to the first available FOV FOV1 to a next place corresponding to the third available FOV FOV3. For example, the care object OBJ may move through a door D from the current place to the next place. In response to detecting of the care object OBJ moving from the current place towards the next place, the processor 110 of the first surveillance device 100-1 is configured to send a moving signal to the third surveillance device 100-3 through the network module of the first surveillance device 100-1. In response to receiving the moving signal, the processor 110 of the third surveillance device 100-3 is configured to adjust a collaborative parameter (e.g., height, direction, angle, zoom ratio) of the collaborative camera through a collaborative tripod of the third surveillance device 100-3. That is, the third surveillance device 100-3 will be ready for tracking the care object OBJ while the care object OBJ moves into the next place corresponding to the third available FOV FOV3. Therefore, a low cost and effective home care utilizing the surveillance device 100 and the surveillance system 400 may be achieved.

Figure 5:
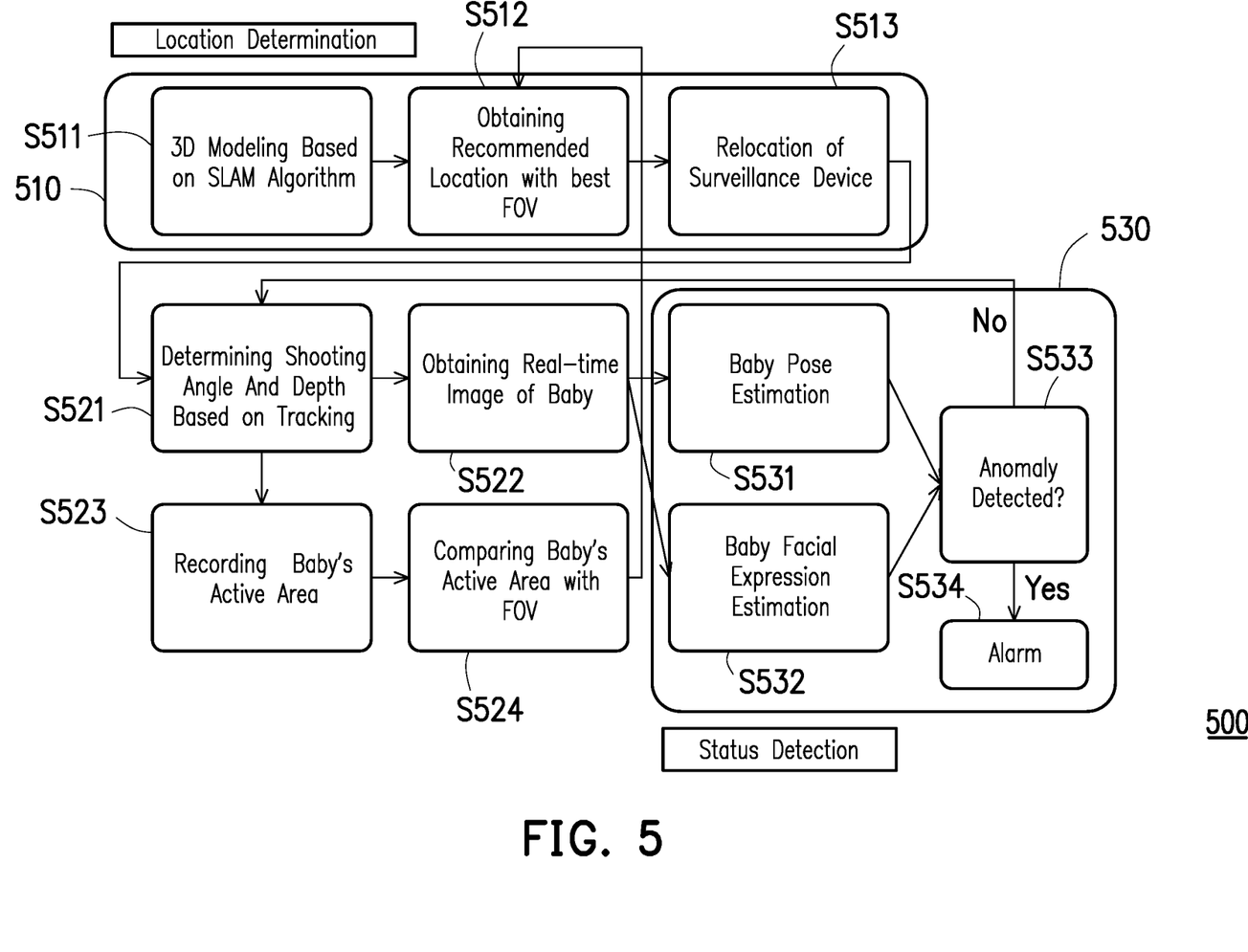
FIG. 5 is a schematic flowchart of a surveillance method according to an embodiment of the disclosure.

FIG. 5 is a schematic flowchart of a surveillance method according to an embodiment of the disclosure. With reference to FIG. 1 to FIG. 5, a surveillance method 500 includes a plurality of steps and some of the steps are categorized into two functions: "Location Determination 510" and "Status Detection 530". Based on the location determination 510, the surveillance method 500 is configured to determine whether a current location LC of the surveillance device 100 (including the camera 120) is with the best available FOV for the camera 120 or not. Based on the status detection 530, the surveillance method 500 is configured to detect a status of the care object OBJ.

The location determination 510 includes a step S511, a step S512, and a step S513. In the step S511, 3D modeling is performed by the surveillance device 100 based on a SLAM algorithm. That is, the processor 110 of the surveillance device 100 is configured obtain a point cloud of a SLAM map of the environment around the care object OBJ. In the step S512, a recommended location of the camera 120 with the best available FOV is obtained by the processor 110 of the surveillance device 100. For example, the processor 110 may be configured to scan all the points in the point cloud to obtain a maximum available FOV for the camera 120. In the step S513, if the recommended location of the camera 120 is different from the current location LC of the camera 120, a relocation of the surveillance device 100 (including the camera 120) may be performed by either the tripod 130 or the user.

After the location of the camera 120 is determined, a step S521, a step S522, a step S523, and a step S524 may be performed. In the step S521, a shooting angle and a shooting depth of the camera 120 is determined (calibrated) based on the tracking of the care object OBJ by the processor 110 of the surveillance device 100. In the step S522, after the camera 120 is calibrated, a real-time object image IMG of the baby (care object OBJ) is obtained by the camera 120.

After the real-time object image IMG of the baby is obtained, the status detection 530 of the baby may be performed. The status detection 530 includes a step S531, a step S532, a step S533, and a step S534. In the step S531, a baby pose estimation is performed to obtain a real-time object pose OP by the processor 110 of the surveillance device 100 based on a baby body tracking algorithm. In the step S532, a baby facial expression estimation is performed to obtain a real-time object facial expression by the processor 110 of the surveillance device 100 based on a baby face tracking algorithm. In the step S533, based on the objection pose OP and/or the facial expression, a determination of an anomaly is detected or not is performed by the processor 110 of the surveillance device 100. In the step S534, in response to the anomaly is detected, an alarm may be triggered and the processor 110 may be configured to output an alarm message MSG to the external device 301 to notify the user. As for the anomaly not being detected, the step S521 may be performed again to keep on tracking the location of the baby.

Referring back to the step S521, after the camera 120 is calibrated, in the step S523, the tracking of the baby is record so as to record an active area of the baby. In the step S524, the active area of the baby is comparing with the current available FOV of the camera 120 to make sure the baby is always being under tracking of the surveillance device 100. In response to the active area of the baby being not completed included in the current available FOV of the camera 120, the step S512 of the location determination 510 may be performed again to find out a better recommended location of the camera 120.

In this manner, a recommended location of the surveillance device 100 (including the camera 120) is determined and the status of the care object OBJ is detected. Therefore, a low cost and effective home care utilizing the surveillance technology is achieved.

Figure 6:
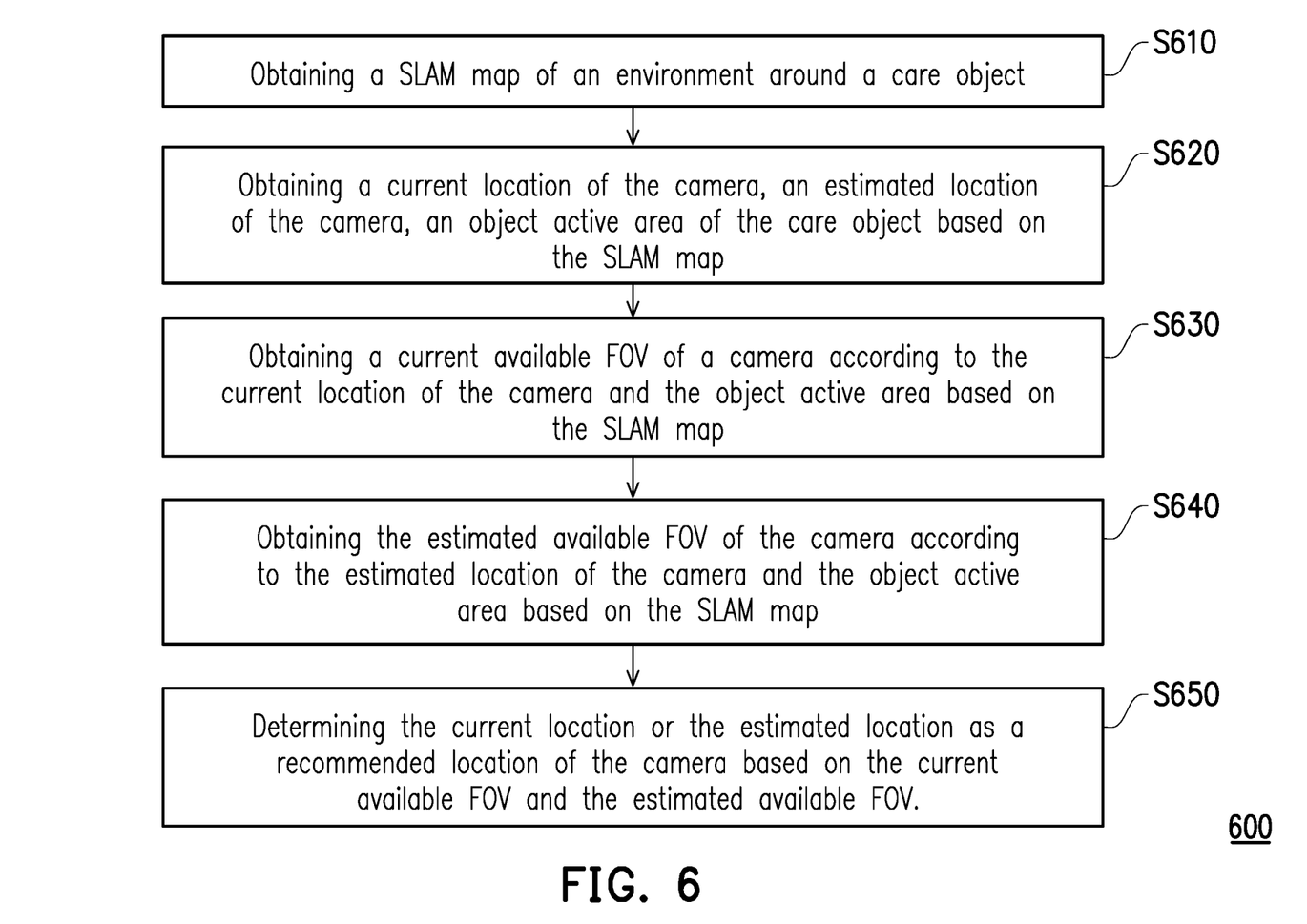
FIG. 6 is a schematic flowchart of a surveillance method according to an embodiment of the disclosure.

FIG. 6 is a schematic flowchart of a surveillance method according to an embodiment of the disclosure. With reference to FIG. 1 to FIG. 6, a surveillance method 600 includes a step S610, a step S620, a step S630, a step S640, and a step S650.

In the step S610, the processor 110 of the surveillance device 100 is configured to obtain a SLAM map of an environment around the care object OBJ. In the step S620, the processor 110 of the surveillance device is configured to obtain a current location LC of the camera 120, an estimated location LE of the camera 120, an object active area of the care object OBJ based on the SLAM map. In the step S630, the processor 110 of the surveillance device 100 is configured to obtain a current available FOV of a camera 120 according to the current location LC of the camera 120 and the object active area based on the SLAM map. In the step S640, the processor 110 of the surveillance device 100 is configured to obtain an estimated available FOV of the camera 120 according to the estimated location LE of the camera 120 and the object active area based on the SLAM map. In the step S650, the processor 110 of the surveillance device 100 is configured to determine the current location LC or the estimated location LE as a recommended location of the camera 120 based on the current available FOV and the estimated available FOV. In this manner, a low cost and effective home care utilizing the surveillance method 600 may be achieved.

In addition, the implementation details of the surveillance method 600 may be referred to the descriptions of FIG. 1 to FIG. 5 to obtain sufficient teachings, suggestions, and implementation embodiments, while the details are not redundantly described seriatim herein.

In summary, according to the surveillance device and the surveillance method, a recommended location of a camera is determined. In this manner, a proper available FOV of the camera towards a care object is obtained. Therefore, a low cost and effective home care utilizing the surveillance technology is achieved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A surveillance device, adapted to provide home care for a care object, wherein the surveillance device comprises:
   a camera, configured to obtain an object image of the care object; and
   a processor, coupled to the camera, wherein the processor is configured to:
   obtain a simultaneous localization and mapping (SLAM) map of an environment around the care object;
   obtain a current location of the camera, an estimated location of the camera, and an object active area of the care object based on the SLAM map;
   obtain a current available field of view (FOV) of the camera according to the current location of the camera and the object active area based on the SLAM map;
   obtain an estimated available FOV of the camera according to the estimated location of the camera and the object active area based on the SLAM map; and
   determine the current location or the estimated location as a recommended location of the camera based on the current available FOV, and the estimated available FOV.

2. The surveillance device according to claim 1, wherein the processor is configured to:
   determine a current available angle of the current available FOV based on the object active area, wherein the camera is configured to obtain information of the care object without any occlusions within the current available angle;

determine an estimated available angle of the estimated available FOV based on the object active area, wherein the camera is configured to obtain information of the care object without any occlusions within the estimated available angle; and in response to the estimated available angle being larger than the current available angle, determine the estimated location as the recommended location.

3. The surveillance device according to claim 1, wherein the processor is further configured to:

identify a plurality of platform-like areas around the care object, wherein each of the plurality of platform-like areas is suitable for disposing the camera;

obtain a plurality of the estimated available FOVs of the camera based on the SLAM map and the plurality of platform-like areas;

compare the plurality of the estimated available FOVs of the camera respectively with the current available FOV of the camera; and determine one of the plurality of platform-like area as the recommended location in response to an estimated available angle of one of the plurality of estimated available FOV corresponding to the one of the plurality of platform-like area being larger than a current available angle of the current available FOV.

4. The surveillance device according to claim 3, wherein the processor is further configured to:

determine the each of the plurality of platform-like area as the estimated location, respectively; and determine a best platform-like area with a largest available angle among the plurality of platform-like areas as the recommend location.

5. The surveillance device according to claim 3, wherein the processor is further configured to:

output an estimated location list, wherein the estimated location list comprises the plurality of the platform-like areas sorted by the plurality of the estimated available FOVs corresponding to all the platform-like areas.

6. The surveillance device according to claim 1, wherein the processor is further configured to:

obtain the object active area of the care object according to a user instruction of a user.

7. The surveillance device according to claim 1, wherein the processor is further configured to:

obtain a current point of the current location and an estimated point of the estimated location, respectively, based on a point cloud of the SLAM map;

emit a plurality of current beams from the current point to the object active area and a plurality of estimated beams from the estimated point to the object active area;

form a spherical surface around the object active area;

determine a current beam density based on the plurality of current beams and the spherical surface and determine an estimated beam density based on the plurality of estimated beams and the spherical surface; and determine the current location or the estimated location as the recommended location of the camera based on the current beam density and the estimated beam density.

8. The surveillance device according to claim 1, wherein the surveillance device further comprises a tripod with a built-in motor, and the processor is further configured to:

track the care object by adjusting a parameter of the camera through the tripod based on a tracking algorithm.

9. The surveillance device according to claim 8, wherein the processor is further configured to:

record a tracking of the care object and generate a tracking record;

determine a tracking area as the object active area; and determine the current location or the estimated location as the recommended location of the camera based on the object active area, the current available FOV and the estimated available FOV.

10. The surveillance device according to claim 1, wherein the surveillance device is configured to cooperate with a collaborative surveillance device, and the processor is further configured to:

compensate a collaborative available FOV of a collaborative camera of the surveillance electronic device with the current available FOV of the camera of the surveillance device; and obtain a maximum sum of the collaborative available FOV and the current available FOV.

11. The surveillance device according to claim 10, wherein the processor is further configured to:

send a moving signal to the collaborative surveillance device in response to the care object is moving towards a next place corresponding to the collaborative available FOV.

12. A surveillance method, adapted to provide home care for a care object, wherein the surveillance method comprises:

obtaining, by a camera and a processor, a SLAM map of an environment around the care object;

obtaining, by the processor, a current location of the camera, an estimated location of the camera, and an object active area of the care object based on the SLAM map;

obtaining, by the processor, a current available FOV of the camera according to the current location of the camera and the object active area based on the SLAM map;

obtaining, by the processor, an estimated available FOV of the camera according to the estimated location of the camera and the object active area based on the SLAM map; and determining, by the processor, the current location or the estimated location as a recommended location of the camera based on the current available FOV and the estimated available FOV.

13. The surveillance method according to claim 12, further comprising:

determining a current available angle of the current available FOV based on the object active area, wherein the camera is configured to obtain information of the care object without any occlusions within the current available angle;

determining an estimated available angle of the estimated available FOV based on the object active area, wherein the camera is configured to obtain information of the care object without any occlusions within the estimated available angle; and in response to the estimated available angle being larger than the current available angle, determining the estimated location as the recommended location.

14. The surveillance method according to claim 12, further comprising:

identifying a plurality of platform-like areas around the care object, wherein each of the plurality of platform-like areas is suitable for disposing the camera;

obtaining a plurality of the estimated available FOVs of the camera based on the SLAM map and the plurality of platform-like areas;

comparing the plurality of the estimated available FOVs of the camera respectively with the current available FOV of the camera; and determining one of the plurality of platform-like area as the recommended location in response to an estimated available angle of one of the plurality of estimated available FOV corresponding to the one of the plurality of platform-like area being larger than a current available angle of the current available FOV.

15. The surveillance method according to claim 14, further comprising:

determining the each of the plurality of platform-like area as the estimated location, respectively; and determining a best platform-like area with a largest available angle among the plurality of platform-like areas as the recommend location.

16. The surveillance method according to claim 14, further comprising:

outputting an estimated location list, wherein the estimated location list comprises the plurality of the platform-like areas sorted by the plurality of the estimated available FOVs corresponding to all the platform-like areas.

17. The surveillance method according to claim 12, further comprising:

obtaining the object active area of the care object according to a user instruction of a user.

18. The surveillance method according to claim 12, further comprising:

obtaining a current point of the current location and an estimated point of the estimated location respectively based on a point cloud of the SLAM map;

emitting a plurality of current beams from the current point to the object active area and a plurality of estimated beams from the estimated point to the object active area;

forming a spherical surface around the object active area;

determining a current beam density based on the plurality of current beams and the spherical surface and determining an estimated beam density based on the plurality of estimated beams and the spherical surface; and determining the current location or the estimated location as the recommended location of the camera based on the current beam density and the estimated beam density.

19. The surveillance method according to claim 12, further comprising:

tracking the care object by adjusting a parameter of the camera through a tripod with built-in motor based on a tracking algorithm.

20. The surveillance method according to claim 19, further comprising:

recording a tracking of the care object and generate a tracking record;

determining a tracking area as the object active area; and determining the current location or the estimated location as the recommended location of the camera based on the object active area, the current available FOV and the estimated available FOV.

* * * * *